United States Patent
Tobin

(10) Patent No.: US 7,327,831 B2
(45) Date of Patent: Feb. 5, 2008

(54) COMMUNICATION MEANS

(76) Inventor: Warren Gregory Tobin, 2 Daldy Street, Freemans Bay, Auckland (NZ) 1001

( * ) Notice: Subject to any disclaimer, the term of this patent is extended or adjusted under 35 U.S.C. 154(b) by 247 days.

(21) Appl. No.: 10/622,638

(22) Filed: Jul. 21, 2003

(65) Prior Publication Data

US 2004/0087301 A1  May 6, 2004

(30) Foreign Application Priority Data

Nov. 5, 2002  (NZ) .................................. 522421

(51) Int. Cl.
*H04M 11/06* (2006.01)
(52) U.S. Cl. ............. 379/88.13; 379/88.2; 379/265.13; 455/466
(58) Field of Classification Search ............... 379/88.2, 379/265.02, 265.13, 88.13; 715/762; 455/466
See application file for complete search history.

(56) References Cited

U.S. PATENT DOCUMENTS

| | | | |
|---|---|---|---|
| 5,155,761 A | * | 10/1992 | Hammond .................. 379/88.2 |
| 6,421,068 B1 | * | 7/2002 | Ingrassia et al. ............ 715/762 |
| 2004/0042612 A1 | * | 3/2004 | Michelson et al. .... 379/265.13 |
| 2004/0076282 A1 | * | 4/2004 | Leijonhufvud ......... 379/265.02 |

\* cited by examiner

*Primary Examiner*—Gerald Gauthier
(74) *Attorney, Agent, or Firm*—Bio Intellectual Property Services (Bio IPS) LLC; O. M. (Sam) Zaghmout

(57) ABSTRACT

A text centre takes in telephonic text message calls. The text centre determines the target address(es) of the calls, and the identity of the target address(es) in each case is recorded in the text centre against a telephone call centre or call centres. The text messages are then sent to the call centre or call centres corresponding to the target address(es). For each call centre the text message calls received there are processed such that a future return call time is assigned to each of the text message calls. For each text message call the call centre concerned automatically forwards a return text message to the telephone concerned, the return text message contains details of when a return telephonic voice call will be made from the call centre to the holder of the telephone. The return voice calls are then made.

10 Claims, No Drawings

COMMUNICATION MEANS

CROSS-REFERENCE TO RELATED APPLICATIONS

This application claims the benefit of New Zealand Application Serial Number: NZ522421, filed Nov. 5, 2002 by the present inventor. The present inventor has filed a UK application which was given the Serial Number: 0306747.7 on Mar. 24, 2003 which has a priority to New Zealand Application Serial Number: NZ522421, filed Nov. 5, 2002.

FIELD OF INVENTION

This invention relates to a method of effecting telephonic communications.

A preferred form of the invention involves a call centre which receives and processes mobile phone text messages.

BACKGROUND ART

It is known to use call centres as a central station for receiving and directing calls to organisations or individuals. It is generally the case that calls to a call centre are telephonic, and involve voice communications between a caller and an operator at a call centre. It is an object of at least one form of the present invention to provide an alternative means of communication involving a call centre, or to at least provide the public with a useful choice.

The term "comprise", "comprises", "comprised" or "comprising", if and when used in this document, should be interpreted non-exclusively, i.e. should be interpreted non-exclusively—to mean "consisting of or including".

GENERAL DESCRIPTION

According to one aspect of the invention there is provided a method of effecting communications, comprising the steps of:
  a) taking text message calls at a text centre wherein such calls are made by way of telephones,
  b) determining the target address(es) for the calls from the information contained in the calls, the identity of the target address in each case being recorded in the text centre against a telephone call centre or telephone call centres,
  c) sending the text message calls to the call centre or call centres corresponding to the respective target address(es),
  d) receiving the text message calls at the call centre or call centres as appropriate,
  e) for each call centre processing each of the text message calls received there such that a return call time is assigned to each of the text message calls, for each text message call automatically forwarding a return text message call to the telephone concerned, the return text message call containing details as to when a return telephonic voice call will be made from the call centre to the holder of the telephone, and
  f) in substantially each case the call centre concerned making the respective return telephonic voice call at the time indicated.

Preferably at step e) above the return text message calls are sent to the telephones from the call centre(s) by way of text centre means.

Preferably the telephones are mobile phones.

Preferably when the text messages are received at the text centre means such messages are routed to a server of the text centre means, which then directs the text messages to the call centre or centres as at step "c".

Preferably the text centre in each case generates a call list listing the telephone number of the telephones, the call list being used by a worker at the call centre concerned in making the return telephonic voice call in each case.

Preferably the call list is generated from information gained by way of automatic caller id technology.

Optionally the text centre means queues the text message calls made by way of the telephones.

Optionally at step c) the text message calls are sent to the call centre or call centres in a queued form.

Optionally the call centre or call centres can inspect details of the queue at the text centre means online.

DETAILED DESCRIPTION

According to one embodiment of the invention there is provided a method of processing or effecting telephonic communications. The method may involve consumers creating SMS text messages using telephones (optionally mobile phones) and sending the messages to respective addresses identifiable at a text centre. For example, the addresses may involve short codes registered with the text centre, or key words (e.g., Mercury or Sky) registered to single short codes.

On arrival of the text messages at the text centre they are routed to a server which forms part of the text centre. From here the text messages are routed to a call centre or call centres as appropriate. A suitable interface or interfaces provide(s) the messages to a call queuing facility of the call centre or call centres. In each case the call centre then automatically generates a return text message informing the holder of the telephone from which the text message was sent, when the call centre will contact that holder with a return telephonic voice communication. In each case this involves the return text message being sent from the call centre to the text centre, and then on to the holder of the telephone.

Computer apparatus at each call centre creates a call list detailing the holders of the telephones that should be called back, and then in each case an operator/individual at the call centre telephones the holder of the telephone to address any requests, concerns, or questions, etc, that that holder may have. In creating the call list the computer apparatus may list the telephone numbers of the holders of the telephones identified by way of "caller id" technology.

It will be appreciated that the embodiments of the invention described above assist consumers to avoid having to wait on a telephone line for long periods of time before making verbal contact with someone at a call centre. The call centre may be that of a Government department, a local body, a business, or virtually any other organisation for which it is desirous to enable consumers to raise queries or the like by way of telephonic voice communications.

It should be appreciated that in some embodiments of the invention the form of the text messages and the return text messages may be manipulated, enhanced, transformed, etc, as they are processed by the text centre. If this should occur it should not be interpreted as meaning that the text messages or the return text messages are no longer the text messages or the return messages respectively.

As will be appreciated, the invention may be implemented with computer technology wherein this is used to process and sort incoming calls at the text centre, etc. Computer technology may also be used at the text centre or call centre(s) to sort, queue and/or otherwise process incoming text message calls and/or outgoing text message calls, etc. In some embodiments of the invention the text centre may provide text messages to the call centre(s) in an already queued format, or may queue incoming text messages in a format such that the call centre(s) can inspect the queue online (e.g., via the Internet), etc, before text messages are received at the call centre(s).

While some preferred forms of the invention have been described by way of example, it should be appreciated that improvements and modifications can occur without departing from the scope of the appended claims.

The invention claimed is:

1. A method of effecting communications, comprising the steps of:
   a) taking text message calls at a text centre means wherein such calls are made by way of telephones and each call is made by a respective telephone holder to a respective target address,
   b) determining the target address(es) of the calls from information contained in the calls, the identity of the target address(es) in each case being recorded in the text centre means against a telephone call centre or telephone call centres,
   c) sending the text message calls to the call centre or call centres corresponding to the target address(es) respectively,
   d) receiving the text message calls at the call centre or call centres as appropriate,
   e) for each call centre, processing each of the text message calls received there such that a future return call time is assigned to each of the text message calls, for each text message call automatically forwarding a return text message call to a respective one of the telephones, the return text message call containing details as to when a return telephonic voice call will be made from the call centre to the holder of the telephone, and
   f) in substantially each case the call centre concerned making the respective return telephonic voice call at the time indicated.

2. A method according to claim 1, wherein at step e) the return text message calls are sent to the telephones from the call centre(s) by way of the text centre means.

3. A method according to claim 1, wherein at step e) the return text message calls are sent to the telephones from the call centre(s) by way of the text centre means, and wherein the telephones are mobile phones.

4. A method according to claim 1, wherein at step e) the return text message calls are sent to the telephones from the call centre(s) by way of the text centre means, and wherein the telephones are mobile phones, and wherein when the text message calls are received at the text centre means such messages are routed to a server of the text centre means, which then directs the text messages to the call centre or centres as at step "c".

5. A method according to claim 1, wherein at step e) the return text message calls are sent to the telephones from the call centre(s) by way of the text centre means, and wherein the telephones are mobile phones, and wherein when the text message calls are received at the text centre means such messages are routed to a server of the text centre means, which then directs the text message calls to the call centre or centres as at step "c", and wherein the text centre in each case generates a call list listing the telephone numbers of the telephones, the call list being used by a worker at the call centre concerned in making the return telephonic voice call as at step "f" mentioned in claim 1.

6. A method according to claim 1, wherein at step e) the return text message calls are sent to the telephones from the call centre(s) by way of the text centre means, and wherein the telephones are mobile phones, and wherein when the text message calls are received at the text centre means such messages are routed to a server of the text centre means, which then directs the text message calls to the call centre or centres as at step "c", and wherein the text centre in each case generates a call list listing the telephone numbers of the telephones, the call list being used by a worker at the call centre concerned in making the return telephonic voice call as at step "f" mentioned in claim 1, and wherein the call list is at least in part generated from information gained by way of automatic caller id technology.

7. A method according to claim 1, wherein at step e) the return text message calls are sent to the telephones from the call centre(s) by way of the text centre means, and wherein the telephones are mobile phones, and wherein when the text message calls are received at the text centre means such messages are routed to a server of the text centre means, which then directs the text message calls to the call centre or centres as at step "c", and wherein the text centre in each case generates a call list listing the telephone numbers of the telephones, the call list being used by a worker at the call centre concerned in making the return telephonic voice call as at step "f" mentioned in claim 1, and wherein the call list is at least in part generated from information gained by way of automatic caller id technology, and wherein the text centre means queues the text message calls made by way of the telephones.

8. A method according to claim 1, wherein at step e) the return text message calls are sent to the telephones from the call centre(s) by way of the text centre means, and wherein the telephones are mobile phones, and wherein when the text message calls are received at the text centre means such messages are routed to a server of the text centre means, which then directs the text message calls to the call centre or centres as at step "c", and wherein the text centre in each case generates a call list listing the telephone numbers of the telephones, the call list being used by a worker at the call centre concerned in making the return telephonic voice call as at step "f" mentioned in claim 1, and wherein the call list is at least in part generated from information gained by way of automatic caller id technology, and wherein the text centre means queues the text message calls made by way of the telephones, and wherein at step c) mentioned in claim 1 the text message calls are sent to the call centre or call centres in a queued form.

9. A method according to claim 1, wherein at step e) the return text message calls are sent to the telephones from the call centre(s) by way of the text centre means, and wherein the telephones are mobile phones, and wherein when the text messages calls are received at the text centre means such messages are routed to a server of the text centre means, which then directs the text message calls to the call centre or centres as at step "c", and wherein the text centre in each case generates a call list listing the telephone numbers of the telephones, the call list being used by a worker at the call centre concerned in making the return telephonic voice call as at step "f" mentioned in claim 1, and wherein the call list is at least in part generated from information gained by way of automatic caller id technology, and wherein the text centre means queues the text message calls made by way of the telephones, and wherein the call centre or call centres can inspect details of the queue at the text centre means online.

10. A method of effecting communications, comprising the steps of:
   a) taking text message calls at a text centre means wherein such calls are made by way of telephones and each call is made by a respective telephone holder to a respective target address,
   b) determining the target address(es) of the calls from information contained in the calls, the identity of the target address(es) in each case being recorded in the text centre means against a telephone call centre or telephone call centres, the call centre or call centres incorporating a team of people ready and able to field voice inquiries from human callers by way of telephone,
   c) sending the text message calls to the call centre or call centres corresponding to the target address(es) respectively,
   d) receiving the text message calls at the call centre or call centres as appropriate,
   e) for each call centre processing each of the text message calls received there such that a future return call time is assigned to each of the text message calls, for each text message call automatically forwarding a return text message call to a respective one of the telephones, the return text message call containing details as to when a return telephonic voice call will be made from the call centre to the holder of the telephone, and
   f) in substantially each case a person at the call centre concerned individually making the respective return telephonic voice call at the time indicated.

* * * * *